UNITED STATES PATENT OFFICE.

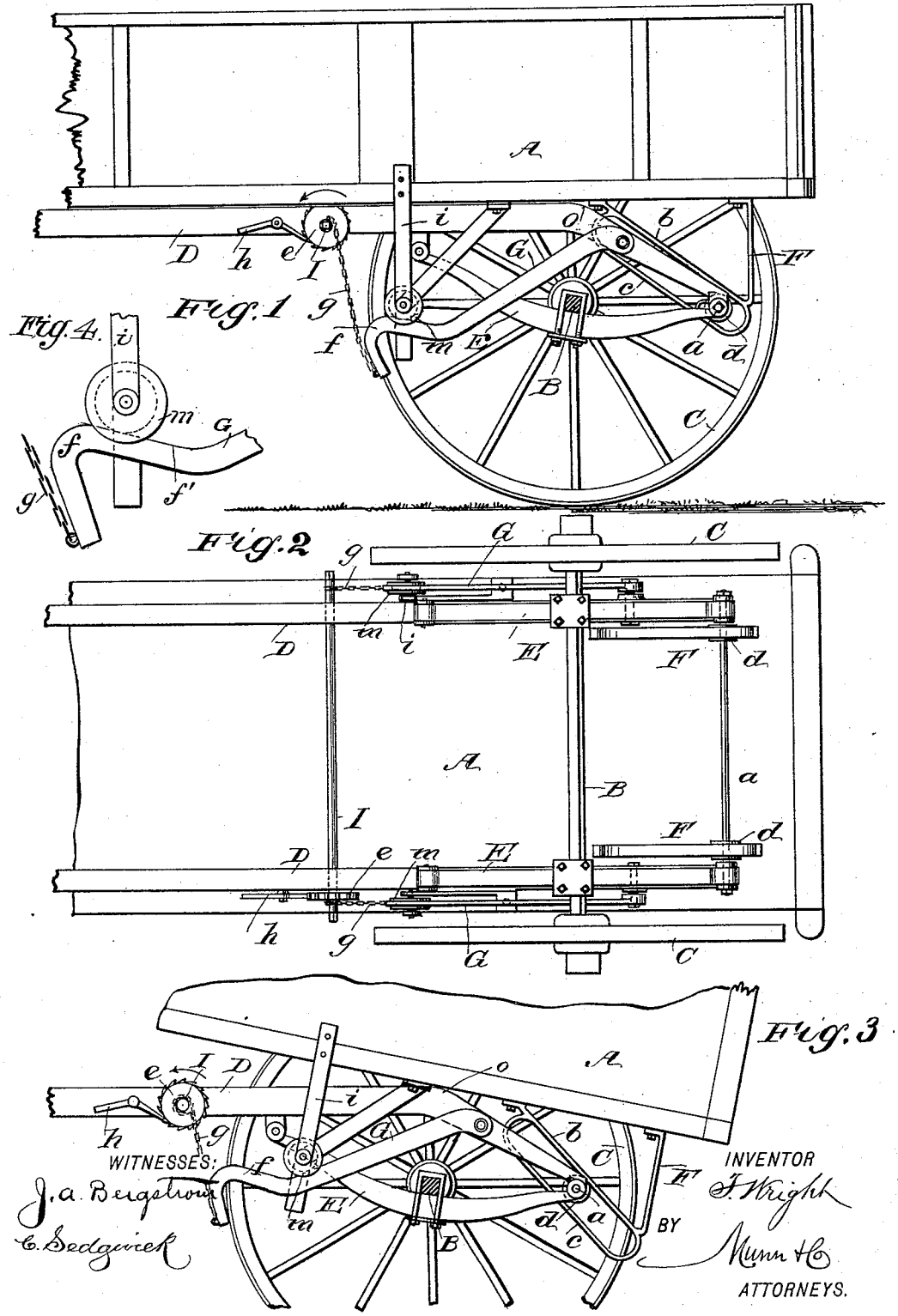

THOMAS WRIGHT, OF JERSEY CITY, NEW JERSEY.

DUMPING DEVICE FOR WAGONS.

SPECIFICATION forming part of Letters Patent No. 529,989, dated November 27, 1894.

Application filed January 15, 1894. Serial No. 496,909. (No model.)

*To all whom it may concern:*

Be it known that I, THOMAS WRIGHT, of Jersey City, in the county of Hudson and State of New Jersey, have invented a new and useful Improved Dumping Device for Wagons, of which the following is a full, clear, and exact description.

My invention relates to an improved device for dumping a load of coal or other loose material from the rear end of a wagon body; and has for its objects to provide a novel, simple mechanism for attachment to the body and running gear of a freight wagon, which will afford convenient means for safely and speedily tilting the body of the wagon rearwardly to discharge its load.

To these ends, my invention consists in the construction and combination of parts, as is hereinafter described and claimed.

Reference is to be had to the accompanying drawings, forming a part of this specification, in which similar letters of reference indicate corresponding parts in all the figures.

Figure 1 is a partly sectional side view of the rear portion of a wagon and the improvement thereon, showing the wagon body in a level condition. Fig. 2 is an inverted plan view of the wagon body and novel dumping attachments. Fig. 3 is a side view in part of the rear portion of a wagon, and the improvements thereon shown adjusted to partly tilt the wagon body rearwardly, and Fig. 4 is a broken detail side elevation of the front end of one of the lifting arms and the part of the body resting thereon.

In the drawings, A is the body of a freight wagon, to be used for hauling coal or other material in a loose condition.

B is the rear axle, and C C the rear wheels on said axle.

A supporting frame is provided for the body A, consisting mainly of two elongated bars D, suitably spaced apart in parallel with each other, so as to permit the body to rest on them near its side edges, as indicated in Fig. 2.

Two similar elliptical plate springs E, are clamped upon the axle B near each wheel C, so as to project their ends toward the front and rear of the body A.

The frame bars D, are bent downwardly at an equal distance from their rear ends, so as to give them a like inclination from a horizontal plane, and said ends are connected together by the transverse stay-rod a, that is also inserted through the rear ends of the springs E, the frame bars being provided with furcated end portions that loosely embrace the spring ends, these parts having central aligned perforations for the reception of the stay-rod, so that the rod forms a pivotal connection between the parts it passes through and is free to rotate therein, a longitudinal displacement of said rod being prevented by a head on one of its ends, and a nut on the other end. Between the rear ends of the frame bars D, two triangular bracket frames F, are secured upon the lower side of the floor of the wagon body A, one near each spring E, with which the bracket frames are parallel.

Each depending bracket frame has one side $b$, projected from its point of connection with the body A, rearwardly and downwardly, and parallel with each lower side $b$ a spaced guide bar $c$, is secured to the frame by bending its end portions upwardly of an equal length, and attaching these terminals to the portion $b$; or the guide bar $c$, may be integrally formed on the frame.

Two similar anti-friction rollers $d$, are secured on the stay-rod at such points as will permit them to have a loose engagement with the guide bars $c$, these rollers being peripherally grooved so as to prevent a lateral displacement on the bracket frames F. The front ends of the springs E are loosely secured to the frame bars D, so as to incline the springs downwardly at their rear ends. On the outer side of each frame bar D, near the point where it is bent at an angle, a dumping bar G, is pivotally connected by its rear end. These similar bars G are bent edgewise forwardly and downwardly so as to locate their front ends a suitable distance below the level portions of the main frame bars D, as shown in Fig. 1.

At the front end of each dumping bar G, a downward curve is produced on it in hook form, the bow $f$ of the hook being elevated above the upper edge of the bar, so as to provide an incline $f'$, ranging upwardly and forwardly as best shown in Fig. 4. A shaft I, is transversely journaled near its ends in opposite perforations of the frame bars D, said shaft having a ratchet toothed wheel e, secured on one end portion that projects outside of one frame bar D, and exterior of said wheel the end of the shaft is shaped to receive and have a locking engagement with a crank handle (not shown), the opposite end of the shaft having a similar formation. A chain g, or other strong flexible connection is attached by one end to the down-curved end of each dumping bar G, and thence extended to have its upper end secured upon the shaft I, outside of the frame bars D. A weighted pawl h, that is pivoted upon the outer side of the frame bar D nearest to the ratchet wheel e, is adapted to have a locking engagement with the ratchet wheel, so as to retain the dumping bars at any point of upward adjustment when the shaft I is rotated in the direction of a curved arrow in Figs. 1 and 3, to produce such an elevation of the bars G.

On each side of the wagon body A, a rearwardly braced arm i, is downwardly projected therefrom, at such points as will locate the arms near to the front ends of the dumping bars G, the relative length of the arms adapting them to project below the dumping bars when the latter are fully depressed, and thus serve as lateral supports for said bars.

On each of the braced depending arms i, a roller m, is pivoted, and said rollers that are located on the outer sides of the arms have a loose engagement with the upper edges of the dumping bars, and when the wagon body A, is in a level position the rollers m rest on the inclines f'. With this arrangement it will be seen that when the lifting arms G are raised they will exert a rearward and upward pressure, by their inclines f', against the rollers m. As represented in the same figure, it will be seen that a level condition of the body on the frame bars D, will dispose the rollers d, near the lower ends of the guide bars c, whereby the wagon body is retained in a proper position on the frame of the running gear, lateral and longitudinal movement being prevented by the weight of the body and its load.

When a load is to be dumped from the rear end of the body A, there is proper adjustment made in parts (not shown) that normally close the rear end, so that a load, like coal, may be discharged therefrom. The shaft I, is now rotated so as to elevate the front ends of the dumping bars G, a partial movement of which is represented in Fig. 3. This elevation of the bars G, will correspondingly raise the front end of the wagon body, which when sufficiently inclined will effect a rearward sliding movement until a preponderance of weight in the body is rearward of the angular bends o on the frame bars D, which will tend to further incline the body A rearwardly and downwardly, for a complete discharge of the load; the degree of inclination being controlled by a chain at the front of the wagon body, or by any other suitable means, a downward draft on this chain (not shown) serving to return the wagon body to a level condition on the frame bars D.

Having thus fully described my invention, I claim as new and desire to secure by Letters Patent—

1. In a dumping device for wagons, parallel frame bars bent downwardly near their rear ends, dumping bars pivoted by ends on the frame bars and means for supporting and sliding the wagon body on said dumping bars, substantially as described.

2. In a dumping device for wagons, the combination with the wagon body, of parallel frame bars bent downwardly near their rear ends, two dumping bars pivoted near one end of each on the frame bars, a body supporting device slidable on the dumping bars and elliptical springs loosely connected at their ends to the frame bars, and intermediately affixed upon the rear axle of the wagon, substantially as described.

3. The combination, with a wagon body and its rear axle and rear wheels, of bent parallel frame bars, dumping bars pivoted to said frame bars, rollers supported on the wagon body and engaging the dumping bars, and means for elevating the front ends of said dumping bars, substantially as described.

4. The combination, with a wagon body, its rear axle and rear wheels, and two springs on said axle, of bent parallel frame bars, dumping bars pivoted at their rear ends on the frame bars, a roller supported on a depending bracket on each side of the wagon body and engaging the dumping bars, and a device for raising and sustaining the front ends of the dumping bars, substantially as described.

5. The combination, with a wagon body, its rear axle, rear wheels, and two elliptical springs on said axle, of two parallel frame bars bent to incline rearward and downward near their rear ends, which ends are clipped upon the rear ends of the springs, two bracket frames on the wagon body, pendent between the springs and having guide bars on their lower inclined sides, a transverse stay bar connecting the bracket frames, rollers on said bar engaging the guide bars, two dumping bars pivoted near their rear ends on the frame bars and inclined forwardly and downwardly, two braced arms on the sides of the body, bearing rollers that engage the dumping bars, a transverse rotatable shaft on the frame bars, flexible connections between said shaft and the dumping bars, and a ratchet and pawl device on said shaft, substantially as described.

6. The combination, with the wagon frame and the body having depending side brackets carrying friction rollers at their lower ends, of pivoted dumping arms movable upwardly against the said rollers and forming a track therefor in the tilting movements of the body, substantially as described.

7. The combination, with the dumping wagon body and the wagon frame, the one having a guideway inclined to the longitudinal direction of the body and the other having permanent engagement with said guideway, the engagement permitting a tilting of the body and a sliding thereof, of lifting arms pivoted to the frame near the rear end, the body having parts in advance of the inclined guideway that are normally in the path of the lifting arms, substantially as described, whereby when the body is tilted by the arms it will slide rearwardly, as set forth.

8. The combination of the wagon frame, the dumping body having a sliding movement on the frame, and lifting arms pivoted to the frame near the rear end thereof and extending forwardly, the arms near the forward ends having upwardly and forwardly ranging inclines, and the body in the normal position having parts resting on said inclines, of the lifting arms, substantially as described.

9. The combination, with the wagon frame and the wagon body thereon, of a guideway secured to the body and arranged at an acute angle to the longitudinal direction thereof, a guiding part on the frame having a permanent sliding engagement with the said inclined guideway, and a device for tilting the body and causing it to slide on the said guide, the guideway having an inclined wall both above and below the guiding part on the frame, whereby either one of such walls will contact with the guiding part in tilting the body both in dumping and in lifting the same, substantially as described.

THOMAS WRIGHT.

Witnesses:
WM. P. PATTON,
C. SEDGWICK.